Figure 4:
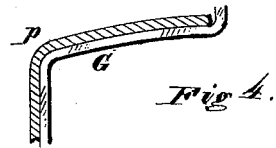

2 Sheets—Sheet 1.
D. W. NORRIS.
INCASED GLASS VESSELS.
No. 195,385. Patented Sept. 18, 1877.
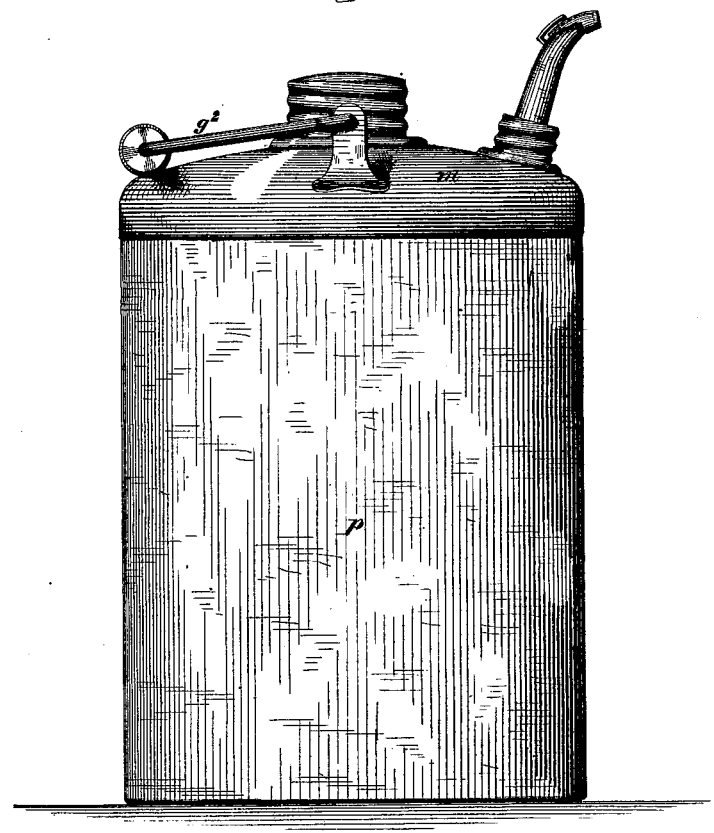
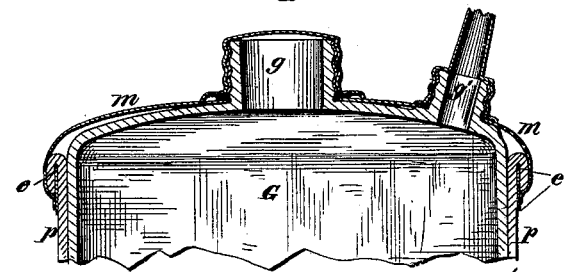
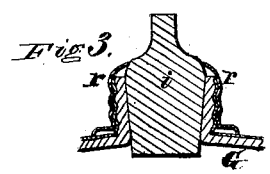
Witnesses.
Harry King
F. McKenny
Inventor:
Danl. W. Norris.
By Hill & Ellsworth,
His Atty.

D. W. NORRIS.
INCASED GLASS VESSELS.

No. 195,385. Patented Sept. 18, 1877.

Witnesses. Inventor.

UNITED STATES PATENT OFFICE.

DANIEL W. NORRIS, OF ELGIN, ILLINOIS.

IMPROVEMENT IN INCASED GLASS VESSELS.

Specification forming part of Letters Patent No. 195,385, dated September 18, 1877; application filed July 23, 1877.

*To all whom it may concern:*

Be it known that I, DANIEL W. NORRIS, of Elgin, in the county of Kane and State of Illinois, have invented a new and Improved Incased Glass Vessel; and I do hereby declare the following to be a full, clear, and exact description of the same, reference being had to the accompanying drawings, forming part of this specification, in which—

Figure 1 is a side view; Fig. 2, a vertical section of the upper part of the vessel; Fig. 3, a vertical section through the stopper; Figs. 4 to 7, inclusive, sections showing the application of the casing to the top of the vessel; and Figs. 8 to 13, inclusive, sections showing the application of the casing to the lower end of the vessel.

Similar letters of reference in the accompanying drawings denote the same parts.

This improvement relates to the incasing of glass demijohns, bottles, jars, cans, and other similar vessels of glass with a protecting covering.

It consists, first, in combining with the covering a metallic support around the lower edge of the vessel, upon which the vessel will rest, but which will not interfere with the inspection of the contents; and, secondly, in certain details of construction, as will be hereinafter more particularly specified.

I have deemed it necessary to show in the drawings only one form of vessel with my improvements applied, since any skilled mechanic, having seen their application to this form, can readily apply them to other forms. The vessel which I have selected for illustration is represented in Figs. 1 and 2, and consists of an ordinary glass can, G, provided with an aperture, $g$, for filling, and a discharge-nozzle, $g^1$, and having a bail, $g^2$, attached to the cover or casing by any suitable means.

I incase the walls and top of the vessel with paper $p$ or metal $m$, extending down under the edges of the bottom, so as to form a support, upon which the can rests, but leaving the central part of the bottom uncovered, for the purpose of enabling the contents to be readily seen by lifting the vessel.

In some cases it may be best to cover the sides with paper and the top with metal, or vice versa, or to cover either sides or top, or both, with a casing of paper, surrounded by an outer casing of metal. Several of these combinations are represented in the drawings, Figs. 2 to 13, inclusive.

I prefer to construct the supporting metal rim under the vessel in such manner that it shall possess a certain degree of elasticity, proportioned to the weight or fragility of the vessel, in order to save the latter from violent concussion when dropped upon an unyielding surface. Several modifications for this purpose are shown in Figs. 9 to 13, inclusive.

I do not limit myself to the details of construction shown in the drawings, but will proceed to describe them, in order to explain to mechanics skilled in the art some of the various modes in which the casing may be constructed and applied for practical use.

Figure 5:
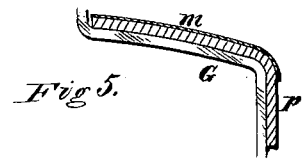
Figure 6:
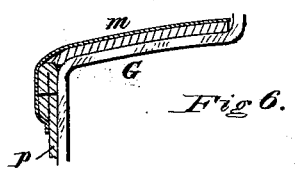
Figure 7:
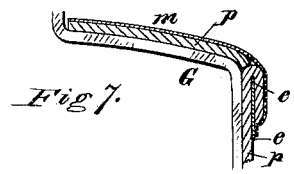
Figure 8:
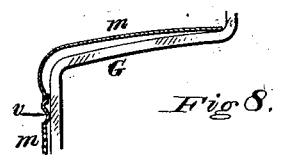

In Fig. 2 a paper or paper-board casing is applied to the sides of the vessel, and is combined with a sheet-metal covering applied to the top. The connection between the two is effected by having the upper edge of the paper turned down upon a sheet-metal hoop, $e$, to which the lower edge of the top casing is fitted and soldered, or otherwise fastened. Fig. 7 shows substantially the same construction, except that a pad of paper is applied between the glass and the top covering. In Fig. 6 the same pad is applied under the top covering; but in connecting the sheet-metal top cover to the paper side case the band or hoop $e$ is omitted, and the two casings are simply riveted together, the sheet metal being fitted around under the outer fold of the paper, to relieve the rivets of undue strain. In Figs. 4 and 5 the paper side casing is molded or otherwise formed to fit also over the top of the can, so that the side and top casings are continuous; and in Fig. 5 a metal cap is represented as applied over the paper. In Fig. 8 a sheet-metal side casing is represented as combined with a sheet-metal top casing, the two sheets being united along their edges by any suitable means, and being held away from the glass by means of internal ribs formed on the sheet metal, as represented at $v$ $v$, or by means of interposed strips of any suitable elastic material secured to the casing, as shown in Fig. 12.

Figure 9:
Figure 10:
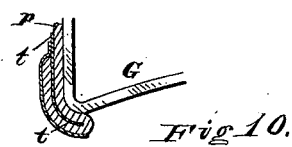
Figure 11:
Figures 12, 13:
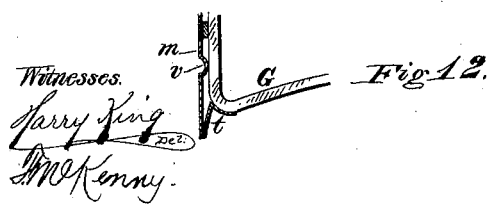

The annular bottom flange is represented at $t$, and may consist of a supporting-lip, turned in under the can, combined with a downwardly-projecting angle, as shown in Fig. 12, or with an independent rim, as seen in Fig. 13; and the inner edge of the independent rim may also be united to under-turned lip, as illustrated in Fig. 11. Where the paper side casing is employed, the metal lip is attached independently, as represented in Figs. 9 and 10. In the former figure the paper extends straight down, and to its lower edge the sheet-metal rim is riveted, and is either bent in under the can, or is soldered or riveted to a second piece of sheet metal, which extends in under the can. In the latter figure the paper is doubled back over the sheet-metal lip, and a second piece of sheet metal is applied outside and is riveted to the paper side case, or riveted or soldered to the first-mentioned sheet-metal lip. In both instances the outside bearing-surface is of metal, and the comparatively rigid metal is so combined with the more yielding paper that a sufficiently elastic support is provided for the can. The same result can measurably be attained even if the lower edge of the paper or metal side casing extends down only to the connection shown in Fig. 9, and the supporting-lip be formed to extend from that point downward below the edge of the glass vessel, and then be bent up into contact with the bottom inside of the edge, so as to leave an open space immediately under the edge of the vessel, in which case the elasticity of the metal rim alone will answer the purpose.

The filling-orifice $g$ and discharge-nozzle $g^1$ are made independent of each other, in order that either may answer as an air-vent, while the other is employed for its legitimate purpose. The former is covered with a screw-cap, of sheet metal, and the latter is provided with a projecting bent cock, secured to the glass collar by a screw-connection.

Both glass collars are peripherally covered with sheet metal, which laps over the metal or paper top casing of the vessel, in order to prevent any liquid from working under the casing; and the peripheral covering of the collars may be packed or cemented to the glass, to render the result more certain.

The screw-cap and nozzle serve to lock the top casing down and assist in supporting the vessel when raised by the bail, thereby to that extent relieving the side casing from undue strain.

When the vessel is to contain acids or other corrosive or volatile liquids, a ground-glass stopper may be applied, as represented at $i$, Fig. 3, and may be held securely in place by an outside ring, of metal, $r$, screwing down over the glass collar, and provided with a retaining-flange at its upper edge, which locks over the shoulder of the glass stopper and prevents the latter from working out.

Some of the advantages of this mode of incasing glass vessels are, that it adds only slightly to the weight and size of the vessel; is inexpensive, is neat in appearance, and perfectly incases and protects the vessel at all essential points, so as to prevent injury from contact with other objects, while it does not prevent the condition of the interior or of the contents from being inspected at pleasure.

The mode of constructing the case so as to cover the sides and top, but leave the bottom exposed, is of great value when the vessel is to contain substances that are chemically affected by light, inasmuch as it protects the vessel from the access of the light rays, and yet does not hinder a free inspection of its contents, the only space that is capable of transmitting light being closed by setting the vessel on its bottom, and exposed by raising it therefrom for the purpose of examining its contents.

Having thus described my invention, what I claim as new is—

1. An incased glass vessel for containing and transporting liquids, having an elastic metallic rim extending under the edges of the bottom, for the purpose of furnishing a support for the vessel without excluding light through the bottom when the incased vessel is raised, substantially as described.

2. The combination of a glass vessel, paper side case, and metal top covering, substantially as described.

3. In combination with an incased glass vessel, a glass neck or collar around the supply or discharge orifice, having external screw-threads, a metal covering around the periphery of the collar, and having screw-threads and a screw cap, ring, or nozzle adapted to overlapping the metal covering, substantially as described.

4. In an incased glass vessel, the combination of the lifting-bail or handle and the inclosing case with a screw-neck, and a cap or ring screwing or otherwise secured around said neck, and lapping over the top covering, whereby in lifting the vessel the whole or a portion of the weight is supported by the screw-neck, substantially as described.

DANIEL W. NORRIS.

Witnesses:
FRANK McKENNY,
MELVILLE CHURCH,